(12) United States Patent
Ergen et al.

(10) Patent No.: US 12,184,439 B2
(45) Date of Patent: Dec. 31, 2024

(54) SMART HOTEL

(71) Applicant: DISH Wireless L.L.C., Englewood, CO (US)

(72) Inventors: Christopher William Krasny Ergen, Littleton, CO (US); Charles W. Ergen, Littleton, CO (US); Max S. Gratton, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 17/960,185

(22) Filed: Oct. 5, 2022

(65) Prior Publication Data
US 2024/0121129 A1    Apr. 11, 2024

(51) Int. Cl.
*H04L 12/28* (2006.01)
*H04L 67/125* (2022.01)
*H04L 67/52* (2022.01)
*G06Q 50/12* (2012.01)

(52) U.S. Cl.
CPC ........ *H04L 12/2816* (2013.01); *H04L 67/125* (2013.01); *H04L 67/52* (2022.05); *G06Q 50/12* (2013.01)

(58) Field of Classification Search
None
See application file for complete search history.

(56) References Cited

U.S. PATENT DOCUMENTS

| | | | |
|---|---|---|---|
| 6,571,221 B1 | 5/2003 | Stewart et al. | |
| 7,231,516 B1 | 6/2007 | Sparrell et al. | |
| 7,372,821 B2 | 5/2008 | Sato et al. | |
| 8,108,493 B2 | 1/2012 | Lakamp | |
| 8,495,729 B2 | 7/2013 | Park | |
| 8,621,530 B1 | 12/2013 | Guzman et al. | |
| 8,856,843 B1 | 10/2014 | Hubach et al. | |
| 8,903,980 B2 | 12/2014 | Hyvarinen et al. | |
| 9,215,139 B2 | 12/2015 | Hyvarinen et al. | |

(Continued)

OTHER PUBLICATIONS

U.S. Appl. No. 18/407,659, Prosecution History through May 30, 2024 (available at Patent Center).

(Continued)

*Primary Examiner* — K. Wong
(74) *Attorney, Agent, or Firm* — Wash Park IP Ltd.; John T. Kennedy

(57) ABSTRACT

Devices, systems and methods for configuring structures and environs based on detected users and generic or known itineraries are described. A system may include: a hub having a data store, non-transiently storing computer instructions for a hub tracker engine (THE) and for a hub response engine (HRE) and a processor; a tracker node; and a responding device. The HTE instructs operations including fine or coarse user detection, and tracking operations. The system thereby tracks the user within a structure and determines whether to respond to the user. The HRE configures the responding device as at least one of a current responding device, a next responding device, and a destination responding device. Coarse user detection may include powering-on the tracker node, establishing a tracker link with the hub, communicating a tracker data signal to the hub, and analyzing the tracker data signal for a presence of the user at a location.

20 Claims, 6 Drawing Sheets

(56) References Cited

U.S. PATENT DOCUMENTS

| | | |
|---|---|---|
| 9,326,139 B2 | 4/2016 | Johan |
| 9,330,250 B2 | 5/2016 | Medvinsky et al. |
| 9,532,097 B1 | 12/2016 | Chen et al. |
| 10,291,956 B2 | 5/2019 | Zdepski et al. |
| 10,327,035 B2 | 6/2019 | Zerr et al. |
| 10,631,042 B2 | 4/2020 | Zerr et al. |
| 10,743,075 B2 | 8/2020 | Zerr et al. |
| 10,996,702 B2 | 5/2021 | Imes et al. |
| 11,330,326 B2 | 5/2022 | Zerr et al. |
| 11,671,651 B2 | 6/2023 | Zerr et al. |
| 11,770,197 B2 * | 9/2023 | Zhang .................. H04B 17/309 382/103 |
| 2003/0061315 A1 | 3/2003 | Jin |
| 2005/0283791 A1 | 12/2005 | McCarthy et al. |
| 2006/0281477 A1 | 12/2006 | Downes |
| 2007/0088814 A1 | 4/2007 | Torii |
| 2008/0004075 A1 | 1/2008 | Horton |
| 2008/0095374 A1 | 4/2008 | Schreyer |
| 2010/0128709 A1 | 5/2010 | Liu et al. |
| 2010/0180312 A1 | 7/2010 | Toya |
| 2011/0116419 A1 | 5/2011 | Cholas et al. |
| 2011/0314192 A1 | 12/2011 | Ahn et al. |
| 2012/0151510 A1 | 6/2012 | Ramaswamy et al. |
| 2012/0210011 A1 | 8/2012 | Liu et al. |
| 2012/0259967 A1 | 10/2012 | Hyvarinen et al. |
| 2013/0111522 A1 | 11/2013 | Tatem et al. |
| 2013/0346564 A1 | 12/2013 | Warrick et al. |
| 2014/0033236 A1 | 1/2014 | Guzman et al. |
| 2014/0337927 A1 | 11/2014 | Medvinsky et al. |
| 2015/0051994 A1 | 2/2015 | Ward et al. |
| 2015/0324332 A1 | 11/2015 | Perret |
| 2016/0099928 A1 | 4/2016 | Chatwin et al. |
| 2016/0080821 A1 | 6/2016 | Makhijani et al. |
| 2016/0227408 A1 | 8/2016 | Sherin |
| 2017/0094345 A1 | 3/2017 | Zerr et al. |
| 2022/0148217 A1 | 5/2022 | Hallett et al. |
| 2022/0284624 A1 | 9/2022 | Nimmagadda et al. |
| 2023/0116882 A1 | 4/2023 | Bates et al. |
| 2023/0269420 A1 | 8/2023 | Zerr et al. |

OTHER PUBLICATIONS

U.S. Appl. No. 18/626,211, Prosecution History through May 30, 2024 (available at Patent Center).

U.S. Appl. No. 18/669,902, Prosecution History through May 30, 2024 (available at Patent Center).

"Ultra-Wideband RTLS, Postitioning, & Sensor Technology", Inpixon.com, web page downloaded from the Internet at https://www.inpixon.como/technology/standards/ultra-wideband, on Jun. 9, 2024.

Fan, J. I., and K. Khoshelham. "Augmented Reality Asset Tracking Using Hololens." ISPRS Annals of the Photogrammetry, Remote Sensing and Spatial Information Sciences 4 (2021): 121-127. (Year: 2021).

U.S. Appl. No. 18/885,679, Application as filed Sep. 15, 2024 (Available at USPTO Patent Center).

U.S. Appl. No. 17/575,497, Prosecution History through Oct. 26, 2024 (available at Patent Center).

U.S. Appl. No. 17/960,185, Prosecution History though Oct. 26, 2024 (available at Patent Center).

U.S. Appl. No. 18/407,659, Prosecution History though Oct. 26, 2024 (available at Patent Center).

U.S. Appl. No. 18/626,211, Prosecution History throughOct. 26, 2024 (available at Patent Center).

Veluchandhar, V., and K. Kandavel. "WATS-SNADSC: A Wireless Asset Tracking System using Sensor Networks with Auto DetectSpy Camera in Forensic Science." J. Sci 1.4 (2008): 178-185. (Year: 2008).

Wikipedia, "Indoor Positioning System", downloaded from the Internet on Oct. 19, 2021 at https://en.wikipedia.org/wiki/Indoor_positioning_system.

Wikipedia, definition of "AirTag", downloaded from the Internet onOct. 19, 2021 from https://en.wikipedia.org/wiki/airtag.

\* cited by examiner

SMART HOTEL

TECHNICAL FIELD

The technology described herein generally relates to devices, systems, and processes for tracking and identifying a past, current, and predicted location for a user within an environ, such as a hotel, movement of the user through the environ, and performing one or more proactive actions based thereon.

BACKGROUND

Devices, systems, and processes are needed for tracking movement of and identifying current locations of one or more users within or about a hotel or other structure having multiple areas, such as lobbies, dining rooms, guest rooms, offices, and the like. As is well appreciated, a person will often move about a structure going from one environ to another environ, such as from a guest room to a dining room. Such movements may occur repetitiously, such as daily, randomly, or otherwise. Currently, when such movements occur, devices within the various environs are typically not specifically configured for the user. For example, a guest traversing from a guest room to a dining room and back typically has to turn on and off multiple lights, televisions, and the like each time they so traverse. This results in users often not turning off the lights, etc. and resulting energy inefficiencies.

Accordingly, needs exist for systems, devices, and processes for detecting a user, tracking a user through a structure, predicting a user's destination, and based thereon automatically configuring one or more environs (and/or devices therein).

SUMMARY

The various implementations of the present disclosure relate in general to devices, systems, and processes for detecting presence of a given user within a given environ, tracking the user through a structure or thereabout, and based thereon automatically configuring one or more environs. For at least one implementation, one or more of the tracking and/or automatically configuring of an environ may occur in view past monitored user movements, activities and/or behavior.

In accordance with at least one implementation of the present disclosure, a system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions.

For at least one implementation, a system may include a hub. The hub includes a data store which non-transiently stores tracker computer instructions for a hub tracker engine and non-transiently storing response computer instructions for a hub response engine. The hub includes a processor, coupled to the data store. The system includes a tracker node coupled to the hub and a responding device coupled to the hub. When the tracker computer instructions are executed by the processor and the hub tracker engine is instantiated, the hub tracker engine instructs the system to perform tracking operations. The tracking operations may include a coarse user detection operation. When a user has been detected by the coarse user detection operation, the tracking operations may further include one or more of tracking the user within a structure, determining whether to respond to the user. When the determining results in a decision to respond to the user, the hub response engine may be initiated. When the hub response engine is initiated, the response computer instructions, as executed by the processor, instruct the system to perform response operations including: configuring the responding device as at least one of a current responding device, a next responding device, and a destination responding device. Other implementations may include corresponding computer systems, apparatus, and computer programs recorded on one or more computer storage devices, each configured to perform the actions of the methods.

For at least one implementation, the coarse user detection operation further may include powering-on the tracker node, establishing a tracker link between the tracker node and the hub, receiving, by the hub, a tracker data signal from the tracker node, and analyzing the tracker data signal for a presence of the user therein. When the user has been detected by the coarse user detection operation, the tracking operations further may include: identifying a basis for detection of the user. The basis for detection of the user may include image detection. For image detection, the tracking operations further may include identifying an image property, searching the data store for user image data corresponding to the image property, and determining if a match occurs between the image property and the user image data.

For at least one implementation, the basis for detection of the user may include an audible signal and the tracking operations further may include identifying an audible property for the audible signal, searching the data store for audible user data corresponding to the audible property, and determining if a match occurs between the audible property and the audible user data.

For at least one implementation, the system may include: a user tracker device (UTD), coupled to the hub, and logically and physically associated with the use. The UTD communicates to the hub a location data signal which identifies a current location of the user. The location data signal periodically may be communicated by the UTD to the hub.

For at least one implementation, a current responding device, with respect to the user, may be associated with a current action to be performed at a current location of the user. A next responding device, with respect to the user, may be associated with a next action to be performed at the current location or at a second location of the user. The second location may occur, in time, after the current location. A destination responding device, with respect to the user, may be associated with a destination action to be performed at a destination location of the user. The destination location may occur, in at least one of place and time, after the current location and the second location.

For at least one implementation, the response operations further may include determining whether the user may be a known user or a new user. When the user is a new user, the response operations may include obtaining coarse user data and obtaining a generic itinerary. When the user may be a known user, the response operations may include obtaining fine user data, determining if a known itinerary may be available, obtaining either the known itinerary, when the known itinerary may be available, or the generic itinerary, when the known itinerary is not available, and designating the responding device as a current responding device when a location of the responding device corresponds with a current location of the user. When the user is a known user, the response operations further may include determining whether a next responding device is to perform a next action. The next action may be performed at the current location of the user or at a second location of the user. The second location may occur, in at least one of place and time, after the current location. When the determining results in a yes, the response operations may include designating the next responding device to perform the next action. When the user is a known user, the response operations further may include determining whether a destination responding device may be to perform a destination action.

For at least one implementation, the system may include a user tracker device (UTD), coupled to the hub, and logically and physically associated with the user. The UTD communicates to the hub a location data signal which identifies a current location of the user. For an implementation, the responding device may include a smart device. The smart device may be at least one of a smart thermostat, a smart light, and a smart lock. Implementations of the described operations may include hardware, a method or process, or computer software on a computer-accessible medium.

For at least one implementation, a device may include a processor executing non-transient tracker computer instructions which instantiate a tracker engine. The device may further include a data store, coupled to the processor, non-transiently storing the tracker computer instructions. The tracker engine, when instantiated by the processor, instructs a system to perform tracker operations including a fine user detection of a user, and tracking a user. Other implementations may include corresponding computer systems, apparatus, and computer programs recorded on one or more computer storage devices, each configured to perform the actions of the methods.

For at least one implementation, the tracker operations further may include identifying a basis for the fine user detection of the user. When the basis is an image, the tracker operations may include identifying an image property, searching the data store for user image data corresponding to the image property, and determining if a match occurs between the image property and the user image data. When the basis is an audible signal, the tracker operations may include identifying an audible property for the audible signal, searching the data store for audible user data corresponding to the audible property, and determining if a match occurs between the audible property and the audible user data. When the basis is a location data signal received from a user tracker device (UTD), the tracker operations may include identifying UTD data, searching the data store for UTD data corresponding to the location data signal, and determining if a match occurs between the location data signal and the UTD data.

For at least one implementation, the processor further executes non-transient response computer instructions which instantiate a response engine. The data store non-transiently stores the response computer instructions. The response engine, when instantiated by the processor, instructs at least one responding device in the system to perform response operations which may include configuring a first responding device as at least one of a current responding device, a next responding device, and a destination responding device. A current responding device, with respect to the user, may be associated with a current action to be performed at a current location of the user. A next responding device, with respect to the user, may be associated with a next action to be performed at the current location or at a second location of the user. The second location occurs, in at least one of place and time, after the current location. A destination responding device, with respect to the user, may be associated with a destination action to be performed at a destination location of the user. The destination location occurs, in at least one of place and time, after the current location and the second location. Implementations of the described techniques may include hardware, a method or process, or computer software on a computer-accessible medium.

For at least one implementation, a computer readable medium non-transiently storing computer instructions which, when executed by a processor, instruct a system to detect, track and act responsively to a user by performing tracking operations and response operations. The tracking operations may include a fine user detection of the user or a coarse user detection of the user, and tracking the user. The response operations, for the fine user detection of the user, may include retrieving fine user data from a data store, determining if a user itinerary may be known, and if the user itinerary may be known, retrieving the user itinerary from the data store. Response operations for both the fine user detection and the coarse user detection may include configuring a first responding device as at least one of a current responding device, a next responding device, and a destination responding device. A current responding device, with respect to the user, may be associated with a current action to be performed at a current location of the user. A next responding device, with respect to the user, may be associated with a next action to be performed at the current location or at a second location of the user. The second location occurs, in at least one of place and time, after the current location. A destination responding device, with respect to the user, may be associated with a destination action to be performed at a destination location of the user. The destination location occurs, in at least one of place and time, after the current location and the second location. Other embodiments of this aspect include corresponding computer systems, apparatus, and computer programs recorded on one or more computer storage devices, each configured to perform the actions of the methods.

BRIEF DESCRIPTION OF THE DRAWINGS

The features, aspects, advantages, functions, modules, and components of the devices, systems and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1A:
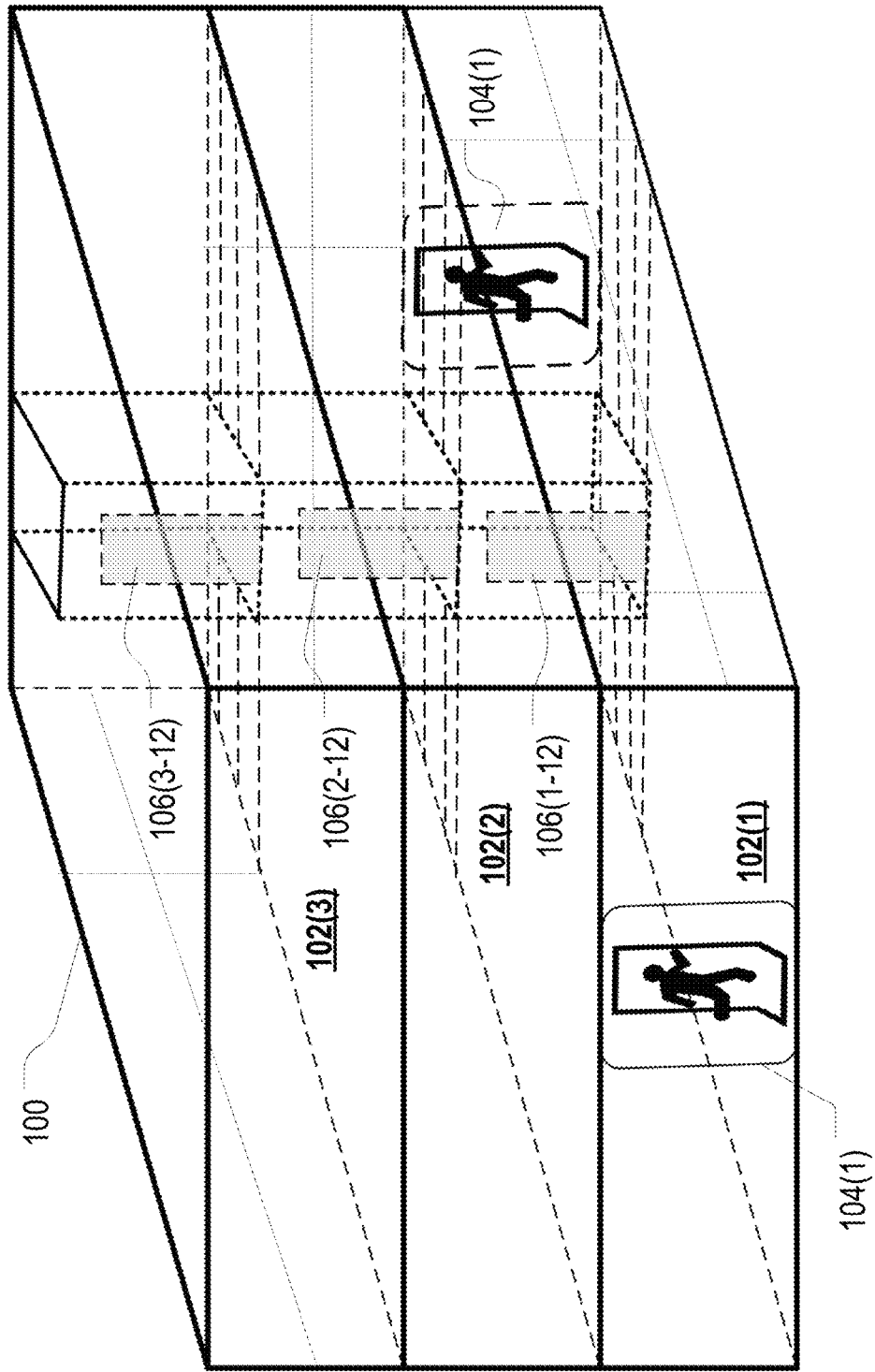
FIG. 1A is an illustrative diagram of a structure in which at least one implementation of the present disclosure may be utilized.

The various implementations described herein are directed to devices, systems, and processes for monitoring behavior for a given user, detecting user activity, and based on past monitored user behavior and/or detected user activity, configuring one or more environs and/or devices within a structure.

As used herein, "Cloud" refers to cloud computing, cloud storage, cloud communications, and/or other technology resources which a given user does not actively manage or provide. A usage of a Cloud resource may be private (limited to certain users and/or uses), public (available for users and/or uses), hybrid, dedicated, non-dedicated, or otherwise. It is to be appreciated that implementations of the present disclosure may use Cloud resources to provide for processing, storage and other functions.

A "processor" refers to one or more known or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration, non-limiting examples including local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

An "instruction" (which is also referred to herein as a "computer instruction") refers to a non-transient processor executable instruction, associated data structure, sequence of operations, program modules, and the like. An instruction is defined by an instruction set. It is commonly appreciated that instruction sets are often processor specific and accordingly an instruction may be executed by a processor in an assembly language or machine language format that is translated from a higher-level programming language. An instruction may be provided using any form of known or later arising programming; non-limiting examples including declarative programming, imperative programming, functional programming, procedural programming, stack-based programming, object-oriented programming, and otherwise.

A "computer engine" (or "engine") refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Data" (which is also referred to herein as a "computer data") refers to any representation of facts, information or concepts in a form suitable for processing by one or more electronic device processors and which, while and/or upon being processed, cause or result in an electronic device or other device to perform at least one function, task, operation, provide a result, or otherwise. Data may exist in a transient and/or non-transient form, as determined by any given use of such data.

"Module" recites definite structure for an electrical/electronic device that is configured to provide at least one feature and/or output signal and/or perform at least one function including the features, output signals and functions described herein. A module may provide the one or more functions using computer engines, processors, computer instructions and the like. When a feature, output signal and/or function is provided using a processor, one more software components may be used and a given module may be include a processor configured to execute computer instructions. A person of ordinary skill in the art (a "POSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as needed basis, or otherwise. Any known or later arising technologies may be used to provide a given module and the features and functions supported therein.

As used herein, "user" refers to a person, animal or other animated or locomotive object.

As used herein, a "structure" is a location and/or a surrounding area about which a user be at any given time. Non-limiting examples of a structure include a home, apartment building, hotel, office, or the like. A structure may include one or more environs (as described below), floors, or the like.

As used herein, a "floor" is a portion of a structure. A floor may be defined in terms of an elevation above or below a given reference plane, such as the ground (e.g., the surface of the Earth at a given location).

As used herein, an "environ" is a portion of a structure. An environ may include a portion of a structure, portions of multiple structures, or areas thereabout (e.g., a hotel patio), one or more surrounding areas, or the like. Non-limiting examples of an environ include a hotel room, an individual apartment or other dwelling unit, an office, a dining facility, an exercise facility, a hallway, elevator, stairwell, patio, pool, courtyard, garage, or the like. An environ may or may not include a surrounding area, such as a hotel room balcony. An environ may include public locations, such as hallways, and private locations, such as a hotel room. Further, herein an "environ portion" or "portion" may include a room or other separately identifiable area or portion of an environ, such as a private hotel room bathroom for a hotel room (the hotel room being the environ, with the bathroom being an environ portion).

Figure 1B:
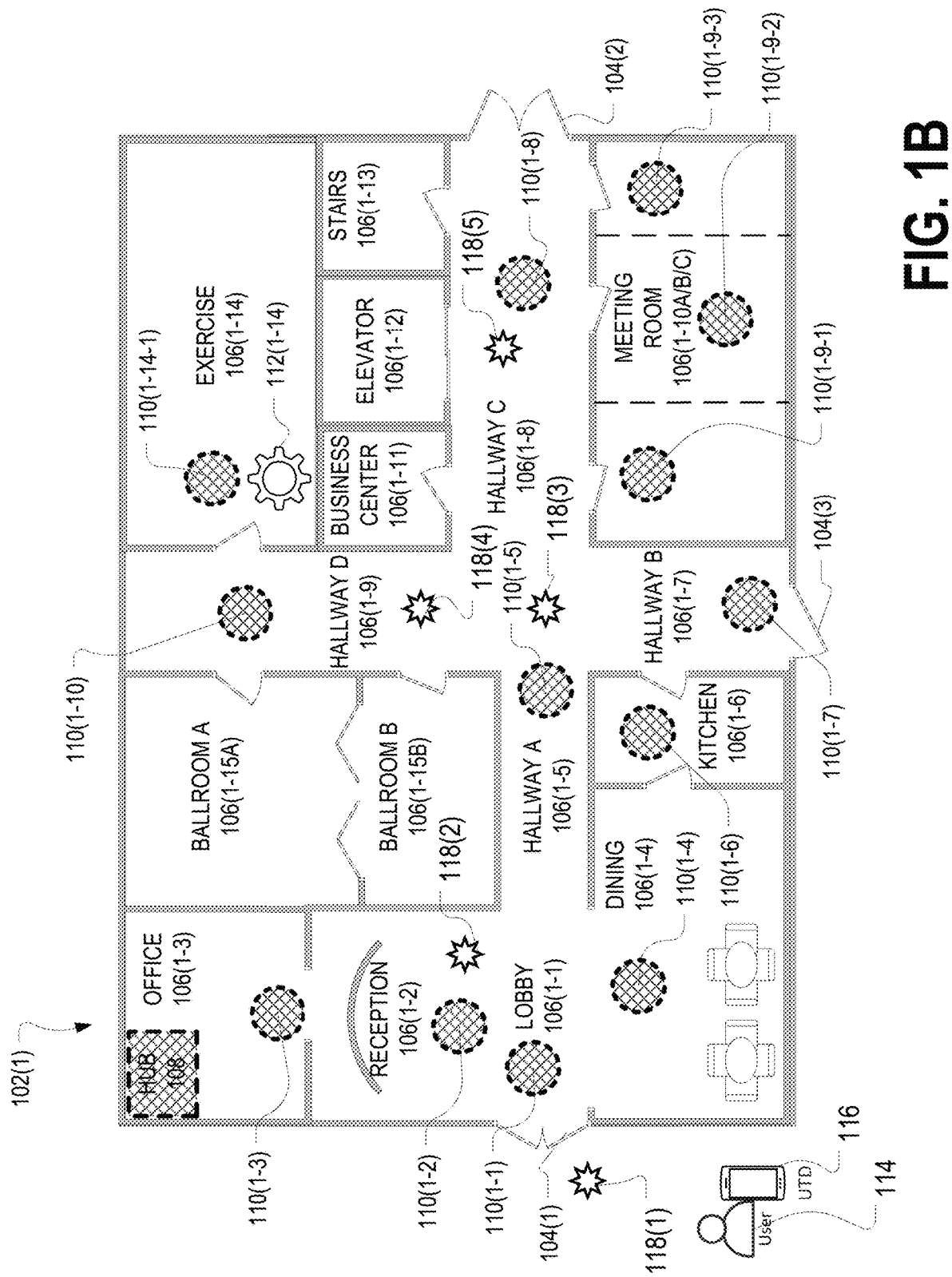
FIG. 1B is an illustrative diagram of a first floor of the structure of FIG. 1A, where one or more tracker nodes of a user tracking system may be utilized to configure one or more environs and/or one or more smart devices and in accordance with at least one implementation of the present disclosure.
Figure 1C:
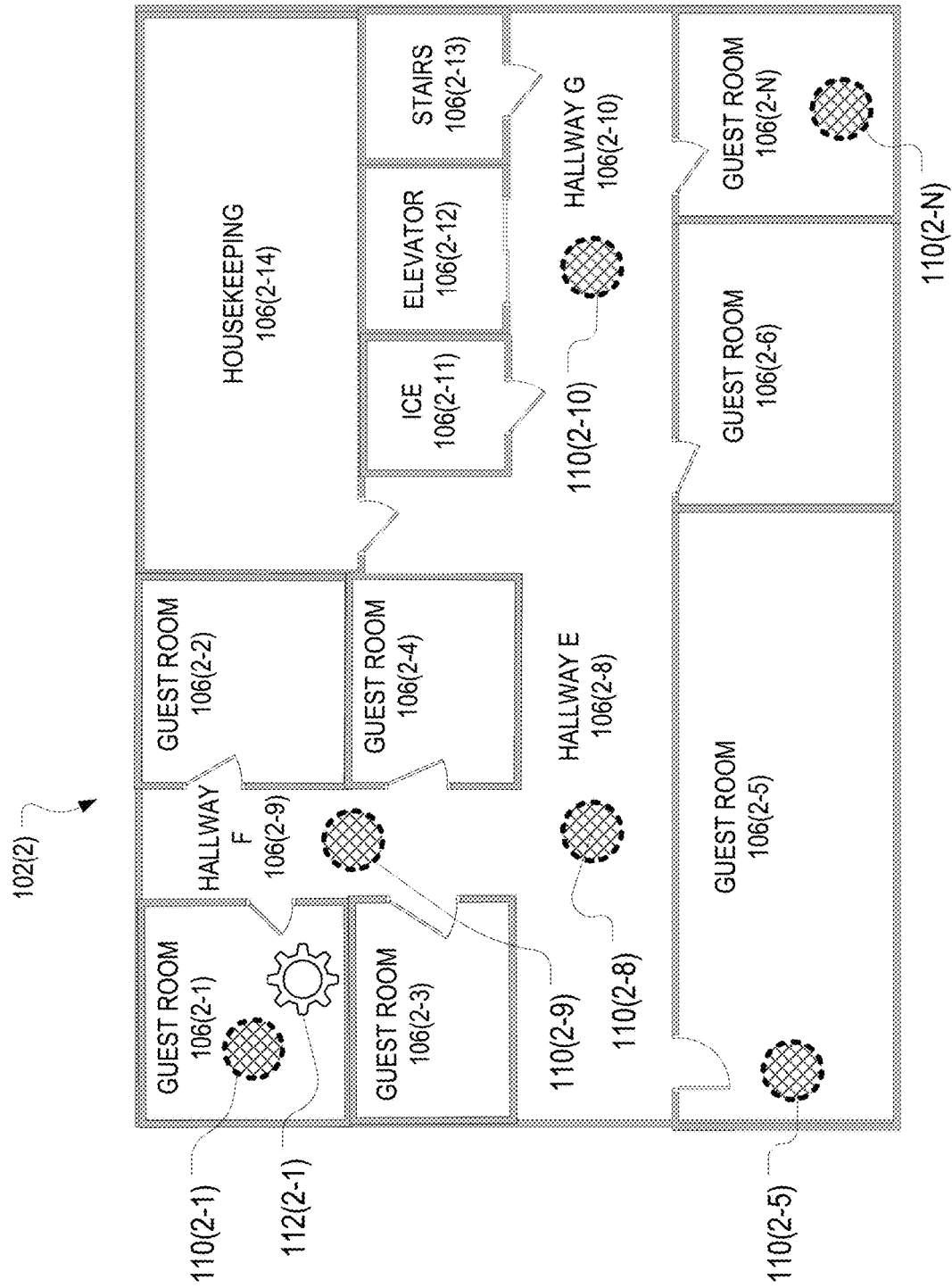
FIG. 1C is an illustrative diagram of second floor of the structure of FIG. 1A, where one or more tracker nodes of a user tracking system may be utilized to configure one or more environs and/or one or more smart devices and in accordance with at least one implementation of the present disclosure.

As shown in FIGS. 1A-1C and for least one implementation of the present disclosure, a structure 100 may have one or more floors 102, such as a first floor 102(1), a second floor 102(2), and a third floor 102(3). The structure 100 may include one or more doorways 104, such as front door 104(1), back door 104(2), and side door 104(3). The structure may include one or more environs 106. Herein an environ 106, such as a lobby 106(1-1), may be identified using an "(F-P)" (Floor-Portion) designator, where F and P are both integers. For example, lobby 106(1-1) is on the first floor (F=1) and in a first environ (P=1). Similarly, a Hallway A 106(1-5) may be identified as being located on the first floor (F=1) and in a fifth environ (P=5), where the "5" is a sequence number used for identification purposes in this description and otherwise has no meaning or significance. Some environs 106 may have two or more portions that exist on multiple floors, such as an elevator or stairwell where, herein, the (F) varies while the (P) remains the same. This identification is used for example in FIG. 1A for the elevator environ and portions thereof 106(1-12), 106(2-12) and 106(3-12).

As shown in FIG. 1B, a first floor 102(1), or other floor of a structure 100, may include multiple public, semi-public and/or private environs 106. Non-limiting examples of public environs include a lobby 106(1-1), a reception 106(1-2), a Hallway A 106(1-5), a Hallway B 106(1-7), a Hallway C 106(1-8), a Hallway D 106(1-10), an elevator 106(1-12), a stairway 106(1-13), an exercise room 106(1-14), Non-limiting examples of a semi-private environ include a dining room 106(1-4), a Ballroom 106(1-15), which may include portions Ballroom A 106(1-15A) and Ballroom B 106(1-15B), and a public restroom (not shown). Non-limiting examples of a private environ may include an office 106(1-3), a kitchen 106(1-6), a meeting room 106(1-10), which may include portions A 106(1-9A), B 106(1-9B) and C 106(1-9C), a business center 106(1-11), and the like.

As shown in FIG. 1C, a second floor 102(2), or other floor of the structure 100m may include multiple public environs such as Hallway E 106 (2-8), Hallway F 106(2-9), Hallway G 106(2-10), ice 106(2-11), elevator 106(2-12), and stairway 106(2-13). The second floor 102(2) may include semi-private environs, such as housekeeping 106(2-14). The second floor 102(2) may include private environs, such as first to Nth guest rooms 1-N, as identified by 106(2-1) to 106(2-N). It is to be appreciated that a structure 100 and/or portion thereof may include any number of public, semi-private, and private environs 106 and whether a given environ 106 is public, semi-private, or private, at a given time, may vary by use thereof, users present, users having access thereto, time of day, and otherwise.

System 200

Figure 2:
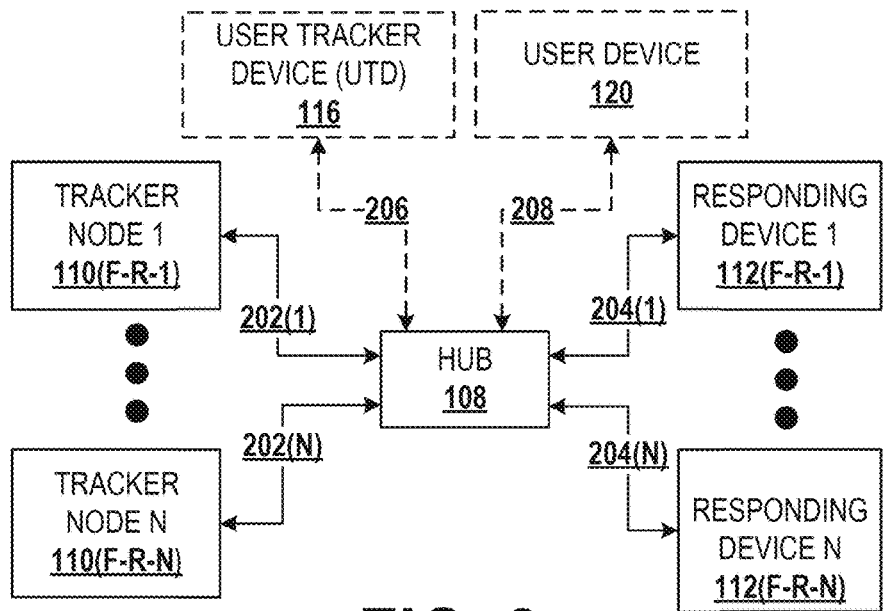
FIG. 2 is a schematic diagram of system for monitoring behavior for a given user, detecting user activity, and based on past monitored user behavior and/or detected user activity, configuring one or more environs and/or devices within a structure and in accordance with at least one implementation of the present disclosure.

As shown in FIG. 2 and as further shown in FIGS. 1A-1C, a system 200 may include a hub 108, at least one "tracker node" 110 (as described below) and at least one "responding device" 112 (as described below). For at least one implementation, the system 200 include one or more of a user tracker device 116 and a user device 120.

The system 200, as instructed by the hub 108 and/or as otherwise determined by one or more system elements independently and/or cooperatively, may be configured to perform one or more "environ functions."

As used herein, an "environ function" is a configuring of one or more of an environ 106, a tracker node 110, and/or a responding device 112 in view of a given user 114 and/or a group of users, to perform or refrain from performing one or more actions. An environ function may include one or more functions that a computing device, a smart device, or other devices coupled to the system 200 can perform separately and/or in conjunction the hub 108, one or more tracker nodes 110, and/or one or more, if any, other responding devices 112. For a non-limiting example, an environ function for a given environ 106, such as guest room 106(2-1), may include actions such as turning on lights, raising blinds, changing room temperature settings, configuring a sound system, and the like. Such actions may be performed by one or responding devices 112. An environ function may be initiated when a user 114 activity, presence, motion, or the like is detected or not detected.

For a non-limiting example, when a given user 114 enters the lobby 106(1-1), a lobby tracker node 110(1-1) may detect the user's presence, send a signal indicative thereof to the hub 108. In response, the hub 108 may send one or more instructions to one or more responding devices 112, such as instructions to smart blinds that raise or lower (open or close) the blinds in a first guest room 106(2-1) and instructions to a smart thermostat that adjust the temperature of the guest room.

For at least one implementation, an environ function may be deactivated when a user does not act within a given period, or takes an action contrary to an expected action. For example, the user proceeding from the lobby 106(1-1) to the dining room 106(1-4), as detected by a detection signal provided to the hub 108 by a dining tracker node 110(1-4), and not to the reception 106(1-2), as determined when a detection signal is not received from a reception tracker node 110(1-2), may result in the hub 108 instructing the kitchen staff (via a responding device provided therein) to present a menu tailored to the given user. Such tailored menu may be provided in view of, e.g., one or more food allergies, user preferences, user dislikes, or otherwise. Such preferences and the like may be determined based on data stored by the system 100 or other storage component.

For at least one implementation, the hub 108 may generate instructions to one or more responding devices 112 based on tracker data generated by one or more tracker nodes, such as by a lobby tracker node 106(1-1) first detecting a user at a first location 118(1), followed by a reception tracker node 110(1-2) second detecting the user at reception 106(1-2), such as at a second location 118(2), followed by a Hallway C tracker node 110(1-8) third detecting the user at a third location 118(3), and the like. Such a transit route may be indicative of the user proceeding to their assigned guest room and based thereon the hub 108 may send one or more instructions to one or more responding devices which, when executed, configure one or more environs, such as a given guest room, in accordance with one or more specified settings, such as a standard room setting, a user specific setting that may be determined, by the hub 108, based on one or more preferences for the given user, or otherwise. The hub 108 may additionally use external data in association with the transit route to generate and send the one or more instructions to a responding device (or refrain from transmitting the instruction thereof). For example, if the user has a dinner reservation and passes through the lobby past the room elevators, the hub 108 may determine that the user 108 will not be visiting their room until later.

Continuing the above example, when the user is detected at a fourth location 118(4), the hub 108 may be configured to generate instructions to one or more responding devices 112 which configure one or more environs. For example, a piece of exercise equipment in an exercise room 106(1-14) may include one or more responding devices 112(1-14) such as a smart treadmill and/or a smart television on the treadmill. The instruction(s) sent by the hub 108 to responding devices in the exercise room 106(1-14) may include instructions which, when executed by a given responding device(s), configure the responding devices accordingly, for example, configuring a smart treadmill to the user's preferred settings (e.g., speed, incline angle, and workout duration), and configuring a smart television to present a preferred source or channel for the user, e.g., network news, sporting news, or the like. The hub 108 may account for other users in a location as well. For example, if the user enters the exercise room 106(1-14) when no other users are present, then the hub 108 may send instructions to responding devices to present content in accordance with a user's preferences. However, if other users are already present in the exercise room 106(1-14), then the hub 108 may leave presentation devices in their current output state.

Tracker Node 110

As shown in FIGS. 1B-1C, a structure 100 may include at least one tracker node 110s. A tracker node 110 may be configured to detect and/or monitor user presence, motion, activity, or the like occurring within a structure 100 and within an environ 106.

As used herein, a "tracker node" 110 is one or more devices, or elements thereof, which can detect a presence, activity, and/or movement of at least one or more users 114 (and the inverse thereof), at a given time, and/or over a given period.

A tracker node 110 may use any known or later arising detection technologies which facilitate detection of a user and/or detection of one or more user activities (or inactivities, as the case may be). Non-limiting examples of detection technologies include: optical/image recognition technologies, which may be configured to detect a user's face, gait, size, appearance and the like; audible or sound based detection technologies, which may be configured to detect sounds, voices, dialects, silence, or the like; motion detection technologies, which may be configured to detect motions of animated objects (such as users) based on changes in air pressure, interception, decrease, degradation, increase, or other changes in one or more portions of the electromagnetic spectrum and/or electromagnetic signals present within a structure and/or an environ, including but not limited to humanly visible portions thereof; radio frequency trackers, such as those provided by APPLE AIRTAGS™, or the like; and other technologies.

A tracker node 110 may be communicatively coupled to the hub 108 by a "tracker link" 202. The tracker link 202 may facilitate communication of "tracker data," in one or more "tracker data signals," from a tracker node 110 to the hub 108 and, in the reverse direction, of "tracker instructions," in one or more "tracker instruction signals," from the hub 108 to a tracker node 110.

As used herein, "tracker data" is data that may be used to determine, at a given time, a location of a user 114, a route or direction of movement (actual, probable or otherwise) for the user 114, an activity of the user 114, a condition of the user 114, or any other data pertaining to a given user or group of users within and/or proximate to an environ 106 and at any given time, including all times, and/or over any given period, including all periods.

A tracker link 202 may use unidirectional, bi-directional, or otherwise configured, wired and/or wireless communications and/or networking technologies, standard, protocols, or the like (herein, individually and collectively, "networking technologies") to facilitate communications between the hub 108 and a given tracker node 110.

Non-limiting examples of networking technologies include packet switched and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. One or more communications and networking standards and/or protocols may be used with a networking technology including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

A tracker node 110 may be configured to independently capture tracker data and/or independently communicate tracker data signals to the hub 108. For example, upon detecting a presence of a user 114 and/or activity by a user 114, a tracker node 110 may output one or more tracker data signals to the hub 108. Such tracker data signals may include any range of data regarding the user 114, where the range may vary from the most informative to the least informative. For example, a set of most informative tracker data for a given user, at a given environ 106 may include the location and activities of the user, whether another person is present, who such other person is (if known or knowable, for example, based on an Internet facial recognition search or other search), whether the activities of the user are solo or involve another person, and the like. Likewise, a least informative set of tracker data may include that the given user is present in the given environ at a given time. For at least one implementation, a hub 108 may be configured to utilize multiple sets of tracker data for a given user to generate one or more user profiles and based on such user profiles predict expected actions by the given user. Based on such expected actions, the hub 108 may generate instructions to responding devices which configure an environ so that such environ is acceptable and/or configured for use by the given user, or the like.

For at least one implementation, a tracker node 110 may be configured to output a tracker data signal upon request by the hub 108. For example, the hub 108 may query, via a tracker instruction, a tracker node 110 to initiate a detection routine by which the tracker node 110 seeks to determine if a user, or group of users, is present in a given environ 106, or portion thereof, engaged in a given activity, or otherwise. A detection routine may be requested by a hub 108 and implemented by one or more tracker nodes 110 with respect to one or more users, one or more activities, over any given period, frequency, randomly, or otherwise.

A tracker data signal and/or a tracker instruction signal may be communicated in any given format, include encrypted and unencrypted, and may include any form, type, quantity, or other characteristic of a given data or set thereof. For example, a tracker signal may include audio, video, textual, or other forms of data.

A tracker node 110 may be an electrical, electro-mechanical, virtualized, or other form of device and may include, and/or have access to, one or more of a processor, data store, communications interface, input/output device, or the like. Any known and/or later arising technologies may be used as a tracker node 110 in a given implementation of the present disclosure.

A tracker node 110 may be configured for public tracker use, where for a public tracker use no expectation of privacy exists by a user 114 with respect to their presence, movement, data or information conveyed therewith or thereby, or otherwise. Non-limiting examples of a tracker node configured for public tracker use include a lobby tracker node 110(1-1), Hallway A tracker node 110(1-5), Hallway B tracker node 110(1-6), Hallway C tracker node 110(1-8), Hallway D tracker node 110(1-9), Hallway E tracker node 106(2-8), Hallway F tracker node 106(2-9), and Hallway G tracker node 106(2-10). A tracker node 110 may output public tracker data when so configured for public use.

A tracker node 110 may be configured for semi-private tracker use, where for a semi-private tracker use some modicum of privacy is expected by a user with respect to their presence, motion, location, activity, data and/or other information conveyed thereby and/or therewith, and the like. Non-limiting examples of a tracker node configured for semi-private tracker use include those provided by a reception tracker node 110(1-2), an office tracker node 110(1-3), a kitchen tracker node 110(1-6) (e.g., a user's dietary restrictions may be considered confidential and shared only with kitchen staff and not others), and others. A tracker node 110 may output semi-private tracker data when so configured for semi-private use.

A tracker node 110 may be configured for private tracker use, where for a private tracker use, high levels of privacy are expected by a user, non-limiting examples of a private tracker use include a credit card reader utilized as a dining tracker node 110(1-4), a meeting room tracker node 110(1-9) of which there may be multiples (as designated by 110(1-9-1) to 110(1-9-3)), an exercise environ tracking node 112 (1-14), guest room tracker nodes 110(2-1) to 110(2-N), and others. A tracker node 110 may vary its mode of operation from public tracker use, semi-private tracker use, and private tracker use based on time, user presence, scheduled activities, or otherwise. A tracker node 110 may operate in multiple use modes of operation at the same time. Tracker modes may vary by user, structure, environ, or otherwise. Depending on whether a given tracker node 110 is operating, at a given time, in a public tracker use, semi-private tracker use, or private tracker use mode of operation, a tracker node 110 may utilize different tracking protocols, with such protocols correspondingly ranging from least restrictive to highly restrictive, where such restrictions may apply to one or more settings such as time of use, how data for the tracker node is stored, how data is communicated by the tracker node (e.g., encrypted or unencrypted), who can access the tracker node data, permitted and unpermitted uses for the tracker node data, and otherwise. A tracker node 110 may output private tracker data when so configured for private tracker use.

Responding Device 112

As used herein, a "responding device" 112 is a device capable of taking, ceasing, and/or refraining from taking an action or two or more actions. As used herein, an "action" is a change of any setting for a responding device and/or a verification that an existing setting for a responding device matches a given setting thereof at a given time or over a given period. For example, a speaker, performs the action of emitting sound. Accordingly, a responding device, such as a sound amplifier, may be configured to perform "actions" that include beginning or ending a providing of sound by a connected speaker, raising, lowering, or keeping the same volume of sound produced by a speaker, changing a source of sound data, such as by changing to a different radio signal or source, or otherwise.

Non-limiting examples of a responding device 112 include: "computing devices," such as laptop computers, personal computers, tablet computing devices, desktop computers, smartphones, smartwatches, printers, scanners, and the like; "smart devices," such as smart thermostats, smart light, smart alarm systems, smart doorbells, smart locks, smart appliances, such as refrigerators, ovens, coffee makers; and "other devices," where "other devices" is a catch-all category and includes any device capable of communicating directly or indirectly with the hub 108 and based on instructions received from the hub 108 taking or refraining from taking one or more actions.

A responding device 112 may be coupled to the hub 108 by a response link 204. The response link 204 may use any known or later arising networking technologies. A responding device 112 may communicates "response data," in a "response data signal," to the hub 108. A responding device 112 may receive "response instructions," in a "response instruction signal" from a hub 108. A response data signal and/or a response instruction signal may be communicated in any given format, include encrypted and unencrypted, and may include any form, type, quantity, or other characteristic of a given data or set thereof. For example, a tracker signal may include audio, video, textual, or other forms of data.

A responding device 112 may be an electrical, electro-mechanical, mechanical, virtualized, or other form of device and may include, and/or have access to, one or more of a processor, data store, communications interface, input/output device, and the like. A person of ordinary skill in the art will appreciate that any known or later arising technologies may be used as a responding device 112 in a given implementation of the present disclosure.

User Tracker Device (UTD) 116

As used herein, a user tracking device (UTD) 116 is a device associated with a given user and capable of identifying a current location of the given user 114. A non-limiting example of a UTD 116 include a "smart watch" (e.g., an APPLE WATCH) which emits a wireless signal that, upon reception by a tracker node, can be used to determine a current location of a given user 114. Another non-limiting example of a UTD is an APPLE TAG. Another non-limiting example is a smartphone (e.g., a Samsung S22™ mobile phone) which has a "find me" or similar feature enabled and where the smartphone is commonly associated with a given user. A UTD may utilize any known and/or later arising user location determination technologies, such as GPS and the like, to determine a given user's current location. Another non-limiting example of a UTD 116 is radio frequency identification (RFID) tag, such tags and the use of RFID technologies are well known in the art.

For an implementation, a UTD 116 may use one or more of Near Field Communications (NFC), Wi-Fi, BLUETOOTH™, cellular, narrow band Internet of Things (NB-IOT), 3G/4G/5G, or other wireless communications technologies. A UTD 116 may include one or more antennas, transceivers, and the like which communicatively couple, directly and/or indirectly, the UTD 116 with the hub 108.

A UTD 116 may be coupled to the hub 108 by a UTD link 206. The UTD link 206 may use any known or later arising networking technologies. A UTD 116 may communicate "location data," in a "location data signal," to the hub 108. A UTD may receive "location instructions," in a "location instruction signal" from a hub 108. A location data signal and/or a location instruction signal may be communicated in any given format, include encrypted and unencrypted, and may include any form, type, quantity, or other characteristic of a given data or set thereof.

User Device (UD) 120

As used herein, a user device (UD) 120 is a device associated with a given user and capable of receiving data from and/or communicating data to the given user 114. A non-limiting example of a UD 120 is a "smart watch" (e.g., an APPLE WATCH). Another non-limiting example of a UD 120 is a smartphone (e.g., a Samsung S22™ mobile phone). A UD 120 may utilize any known and/or later arising technologies which facilitate the exchange of data and information (when the data is presented to the user in a user perceptible form). A user device 120 and a UTD 116 may be provided in a single device or provided separately in multiple devices.

A UD 120 may be coupled to the hub 108 by a UD link 208. The UD link 208 may use any known or later arising networking technologies. A UD 120 may communicate any form, type, quantity, or the like of user data, in a user data signal, to the hub 108. Non-limiting examples of such user data may include itineraries (as provided by a calendaring application on a UD 120), user preferences, user demographics and profile information, user requests, and the like. A UD 120 may receive any form, type, quantity or the like, of user instructions, in a user instruction signal sent by the hub 108. Non-limiting examples of such user instructions include instructions for proceeding from a current location to a next location (as may be needed, e.g., in a large hotel/convention center complex of one or more structures), permissions (such as virtual ID tags) needed to access one or more environs, or the like.

A user data signal and/or a user instruction signal may be communicated in any given format, include encrypted and unencrypted, and may include any form, type, quantity, or other characteristic of a given data or set thereof.

Hub 108

Figure 3:
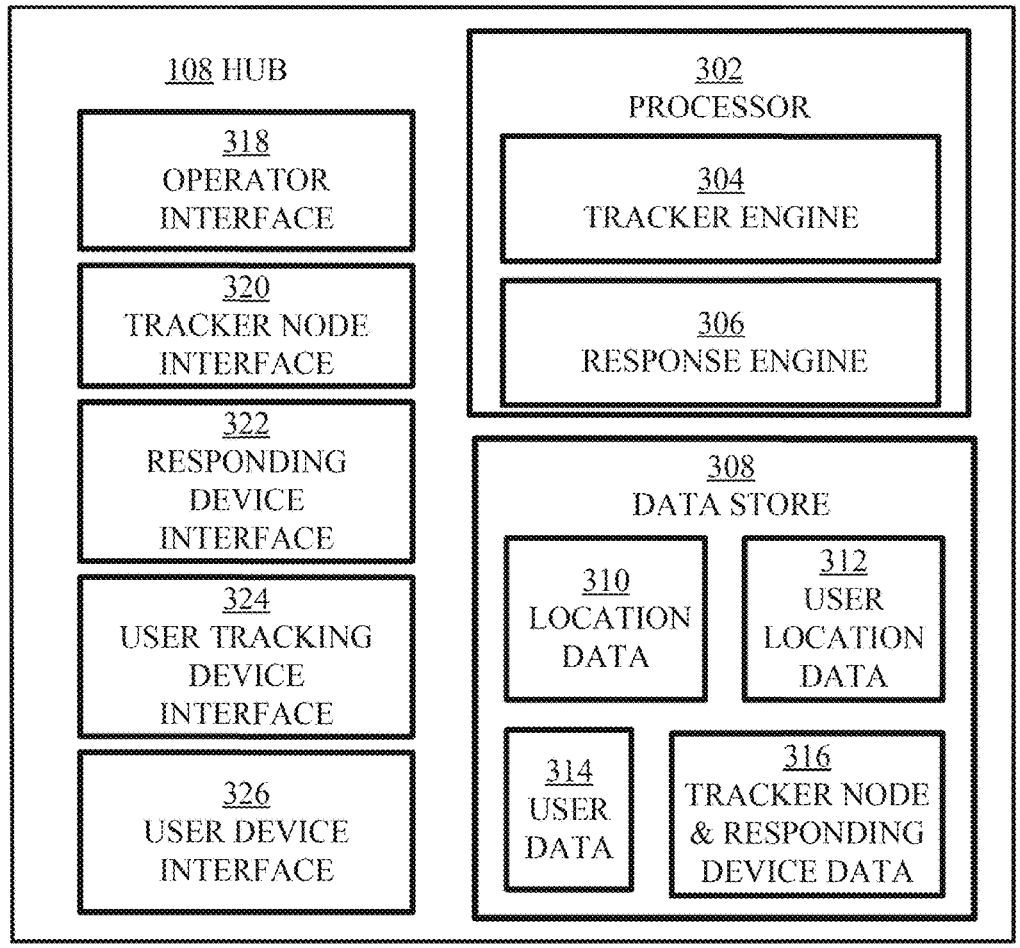
FIG. 3 is a schematic diagram of hub for use in the system of FIG. 2 and in accordance with at least one implementation of the present disclosure.

As shown in FIG. 3 and for at least one implementation, a hub 108 may include a hub processor 302, a hub data store 308, a hub interface 318, and other common components for such devices, such as security components, power supplies, input/output components, and the like. Such common components are not shown in FIG. 3 but are well known in the art and any known or later arising such common components may be used in an implementation of the present disclosure.

The hub 108 may be configured to monitor behavior of one or more users 114 (as represented by activity and inactivity thereof), via one or more tracker nodes 110, and by receiving tracker data signals from the one or more tracker nodes 110. The hub 108 may configure and/or otherwise instruct one or more tracker nodes 110 based on one or more tracker instruction signals sent by the hub 108.

The hub 108 may be configured to initiate actions, or terminate actions already being taken, as the case may be, by instructing one or more responding devices 112. One or more response instruction signals may be communicated by the hub 108 to one or more responding devices 112. The hub 108 may be configured to receive response data signals from one more responding devices 112. A response instruction signal may communicate any given response instruction to one or more responding devices 112. The hub 108 may be configured to receive a response data signal, including any given response data, from a responding device 112. Response data may include data indicative of actions taken (or not taken), results of such actions (if known or detectable), and/otherwise.

The hub 108 may be configured to receive one or more location data signals from a UTD 116. For at least one implementation, tracker data signals and location data signals may be utilized by the hub 108 to generate one or more response instructions to be sent to one or more responding devices 112 and/or one more user instructions to be sent to a UD 120 associated with a given user 114 and/or to multiple users. For example, when a user 114 is determined, based on tracker data and/or location data, to be within a given environ 106 and an incident in and/or near such environ require action, the hub 108 may be configured to send one or more response instructions to one or more responding devices 112, e.g., instructions which close and secure doorways, while also sending one or more user instructions, to user devices 120, which instruct one or more users 114 to huddle in place, or take other actions For a non-limiting example, a tracker node 110 may detect that a given user has awaken and send a tracker data signal to the hub 108. The hub 108 may then send a response instruction signal to a responding device, such as a smart coffeemaker device. The response instruction signal may include response instructions for making coffee, as preferred by the given user, such as including cream, sugar, or the like. The responding device 112 may then proceed to make the coffee and may provide response data back to the hub 108. Such response data, if any, may include various data, such as temperature the coffee, amount consumed, ratios of coffee, cream, sugar or the like actually used, whether the user requested a second cup of coffee, or otherwise. Likewise, the response instruction may be based on any available data, including stored user data. Such user data may indicate, for example, that the given user prefers to receive coffee in the morning that is fully caffeinated and with cream and sugar, while evening coffee is preferably decaffeinated and without cream, sugar, or the like.

Similarly, a hub 108 may be configured to detect actions of multiple users and provide response instructions directed towards the group. For example, a group of users attending a conference in the Ballroom 106(1-15) may individually or, in mass, exit the Ballroom. Based on the monitored behavior, as detected by a Hallway D tracker node 110(1-10), the hub 108 may instruct one or more responding devices 112 to take or refrain from taking one or more actions. For example, the hub 108 may instruct the kitchen staff to present appetizers, drinks, or the like to the group of users.

Hub Processor 302

The hub processor 302 may be configured to instantiate computer applications, logics, engines, and the like facilitating a hub tracker engine 304 and a hub response engine 306. For at least one implementation, the hub processor 302 may have access to one or more non-transient processor readable instructions to instantiate the various applications, logics, engines, and the like.

The hub processor 302 may be operable to perform data and/or signal processing capabilities with respect to tracker data provided by one or more tracker nodes 110. Such tracker data may include images, motion video, or the like. The hub processor 302 may be configured to utilize known and/or later arising user detection technologies. The hub processor 302 may be configured to execute computer instructions and/or data sets obtained from a hub data store 308.

The hub processor 302 may executed computer instructions which include firmware and software instructions, and data for use in operating the hub 108. Such data sets may include software instructions configured for execution by the hub processor 302, another module of the hub 108, or otherwise. Such computer instructions provide computer executable operations that facilitate one or more features or functions of a hub 108 or otherwise.

Hub Tracker Engine 304

The hub processor 302 may be configured to execute computer instructions which instantiate a hub tracker engine 304. When instantiated, the hub tracker engine 304 configures one or more elements of the system 200, such as the hub 108, a tracker node 110, a responding device 112, and/or a user device 120 (herein, generically referred to as the "system"), to perform operations which facilitate detection of a user 114. For at least one implementation, the hub tracker engine 304 configures one or more elements of the system 200 to track a given user 114 within a structure 100.

Figure 4:
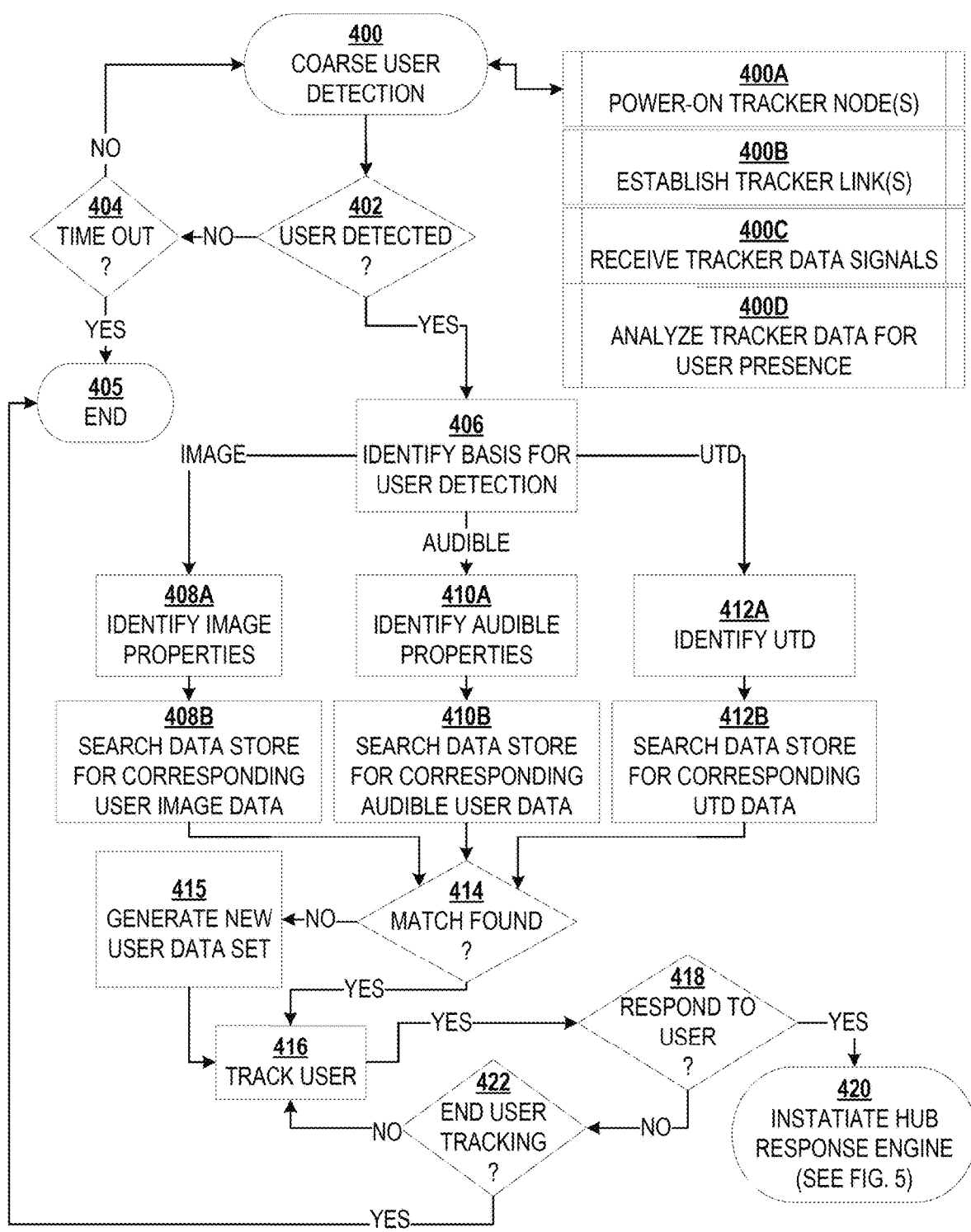
FIG. 4 is a flow chart illustrating a process for detecting a user in accordance with at least one implementation of the present disclosure.

For at least one implementation, the hub tracker engine 304 may configure the system 200 to perform one or more operations shown, for example, in FIG. 4. The hub tracker engine 304 may configure the system 200 to perform less, more and/or other operations than those shown in FIG. 4 and such operations may facilitate detection and/or tracking of a user 114 within a structure 100.

For at least one implementation, the hub tracker engine 304 may configure the system 200 to detect a user 114 outside of a structure 100, provided the user 114 is within a sensing range of a tracker node 110 and/or a UTD 116 associated with the user 114 is within direct or indirect communications range of the hub 108. The hub tracker engine 304 may configure the system 200 to track a user 114 at any location, provided a UTD 116, for a given user 114, is coupled with the hub 108 and the UTD 116 is configured to provide location information to the hub 108.

More specifically referring to FIG. 4, a process for detecting and tracking a user is illustrated for at least one implementation of the present disclosure. As shown per Operation 400, the process may include the hub processor 302 initializing a hub tracker engine 304 which performs a coarse user detection operation. As used herein, "coarse user detection" refers to the detection of a generic user and without using existing user data. As used herein, "fine user detection" refers to the detection of a specific user, such as a specific person, animal, or the like and includes the use of existing user data 314. Coarse user detection, as per Operation 100, may include one or more sub-operations, such as sub-operations 400A-400D, which may include: as per Operation 400A, powering on one or more tracker node(s); as per Operation 400B, establishing tracker links 202 between the hub 108 and the powered on tracker node(s) 110; as per Operation 400C, receiving tracker data signals from the one or more tracker nodes 110; and as per Operation 400D, analyzing tracker data, in received tracker data signals, for the presence of any user 114. For at least one implementation, Operation 400D may initially occur on a tracker node 110 configured to detect presence of any user 114, and upon such detection, communicate tracker data indicative thereof to the hub 108, which may then analyze the received tracker data, as per Operation 400C. Operation 400, and its subparts, may occur continually, on a scheduled basis (for example, when a structure 100 is open for business), on demand, or otherwise.

As shown per Operations 402 and 404, the process may include awaiting until a user is detected or a time-out occurs. A time-out may occur, for example, after a close of regular business hours, or otherwise. For at least one implementation, Operation 404 may not be utilized and user detection may occur while the system 100 is powered. When a user is not detected and a time-out has occurred, the process may end, as per Operation 405. When a user is detected, the process may proceed to Operation 406.

As shown per Operation 406, the process may include identifying a basis for user detection. As discussed above, user detection may occur using one or more technologies including image recognition, voice/audio recognition, via presence of a UTD, or otherwise.

As shown per Operation 408A, when the basis for identifying the user is an image, the process may include identifying one or more image properties. The image properties may be for a single image, a collection of images, a moving image (such as a video), or otherwise. The image properties may vary by tracker node 110.

As shown per Operation 408B, the process may include searching the hub data store 308, and/or other data stores such as those on the Cloud, for corresponding user image data. The search may utilize any known or later arising image recognition technologies, processes, and the like. As shown, the process proceeds to Operation 414.

As shown per Operation 410A, when the basis for identifying the user is audible data, such as that provided by a human voice, a barking dog, or otherwise, the process may include identifying one or more audible properties. The audible properties may be for a single capture of a sound, a collection of sounds (such as a sentence of spoken words), or otherwise. The audible properties may vary by tracker node 110.

As shown per Operation 410B, the process may include searching the hub data store 308, and/or other data stores such as those on the Cloud, for corresponding user audible data. The search may utilize any known or later arising audile data recognition technologies, processes, and the like. As shown, the process proceeds to Operation 414.

As shown per Operation 412A, when the basis for identifying the user is UTD data, the process may include identifying the UTD data. Such identifying may include executing one or more pairing protocols (by which a given UTD may be paired with a given tracker node 110 to facilitate the communication of data therebetween), security protocols, or the like.

As shown per Operation 412B, the process may include searching the hub data store 308, and/or other data stores such as those on the Cloud, for corresponding UTD data. The search may utilize any known or later arising UTD identification technologies, processes, and the like. As shown, the process proceeds to Operation 414.

As shown per Operation 414, the process may include determining if a match exists between the identified image properties, audible properties, UTD data, and/or the like (as per Operations 408A, 410A and 412A) and the stored data (as per Operations 408B, 410B and 412B). Operation 414 may include determining if matches occur for any given basis for user detection, multiple basis, or the like. An iterative process may be used to more specifically identify a user based on multiple basis for user detection. The "determining" operations may be configured to have any degree of confidence between a detected user and a matched user. Such degree of confidence may range from none to absolute and the results of Operation 414 and the degree of confidence obtained for a given detected user may vary by user, time of day, structure, environ or otherwise. Accordingly, the results of Operation 414, which are identified herein as a "yes" or "no" may have other degrees of specificity which may be provided to the hub response engine 306 and used thereby in determining which response to provide at a given time and with respect to a given user. If the result of the determining is "yes," the process proceeds to Operation 416. If the result of the determining is "no," the process proceeds to Operation 415.

As shown per Operation 415, the process may include generating a new user data set for storage in the hub data store 308 (and/or other data store). The new user data set may be generated based on the image properties identified per Operation 408A, audible properties identified per Operation 410A, UTD properties identified per Operation 412A, and/or any available user image data (if any), audible user data and/or UDT data (as obtained per Operations 408B, 410B and/or 412B). The new user data set 415 may be identified by a label indicative of a generic user, such as "John Doe ###" or otherwise. The new user data set 415 may be updated at a later time as other tracker data becomes available, if any, such as other public tracker data, semi-private tracker data, and/or private tracker data.

As shown per Operation 416, the process may include tracking the user throughout the structure, one or more environs therein, and/or one or more environ portions. The tracking may occur for any given time, period, location, or otherwise. The tracking may vary by user. The tracking may include activation and/or deactivation (e.g., when tracking is not to occur) of one or more tracker nodes. Tracking may occur based upon detected user presence, predicted user presence, scheduled user presence (e.g., a user arriving at a hotel typically proceeds to their assigned hotel room upon checking-in), or otherwise. For at least one implementation, tracking may include executing one or more search protocols by which detection of a user within a structure (or thereabout) is initiated. Such a search protocol might arise, e.g., for a user who is late to arrive at a given environ.

As per Operation 418, the process may include determining whether the system 200 is to respond to the user 114. As discussed above, responding to the user 114 may include activating/deactivating one or more responding devices 112. For example, a user having been detected as checking-in to a hotel may initiate a response, by the system, of adjusting the temperature of their assigned hotel room to a preferred setting. When a response is to occur, the process may proceed to Operation 420. When a response is not to occur, the process may proceed to Operation 422.

As per Operation 420, the process may include instantiating a hub response engine 306 (when such engine has not already been instantiated) and/or using an already instantiated hub response engine to generate at least one response. Operations performed by an instantiated hub response engine are further described with respect to FIG. 5 and below, and with respect to at least one implementation of the present disclosure. Other implementations may occur and the generation of a response may include a performing of any actions by one or more responding devices 112 and/or a cessation of actions thereof—such as turning off a radio, television, or the like).

As per Operation 422, the process may include determining whether user tracking is to continue. If so, the process may continue. As shown, the process may continue at Operation 416 but any other Operation shown in FIG. 4 or other operations (not shown) may be used. When user tracking is to end, the process may proceed to Operation 405 and the ending thereof.

The various operations shown in FIG. 4 are described herein with respect to at least one implementation of the present disclosure. The described operations may arise in the sequence described, or otherwise and the various implementations of the present disclosure are not intended to be limited to any given set or sequence of operations. Variations in the operations used and sequencing thereof may arise and are intended to be within the scope of the present disclosure.

Hub Response Engine 306

The hub processor 302 may be configured to execute computer instructions which instantiate a hub response engine 306. When instantiated, the hub response engine 306 configures one or more elements of the system 200, such as the hub 108, a tracker node 110, a responding device 112, and/or a user device 120 (herein, generically referred to as the "system"), to perform actions which configure one or more environs, or portions thereof, in view of a given user 114 or group thereof.

Figure 5:
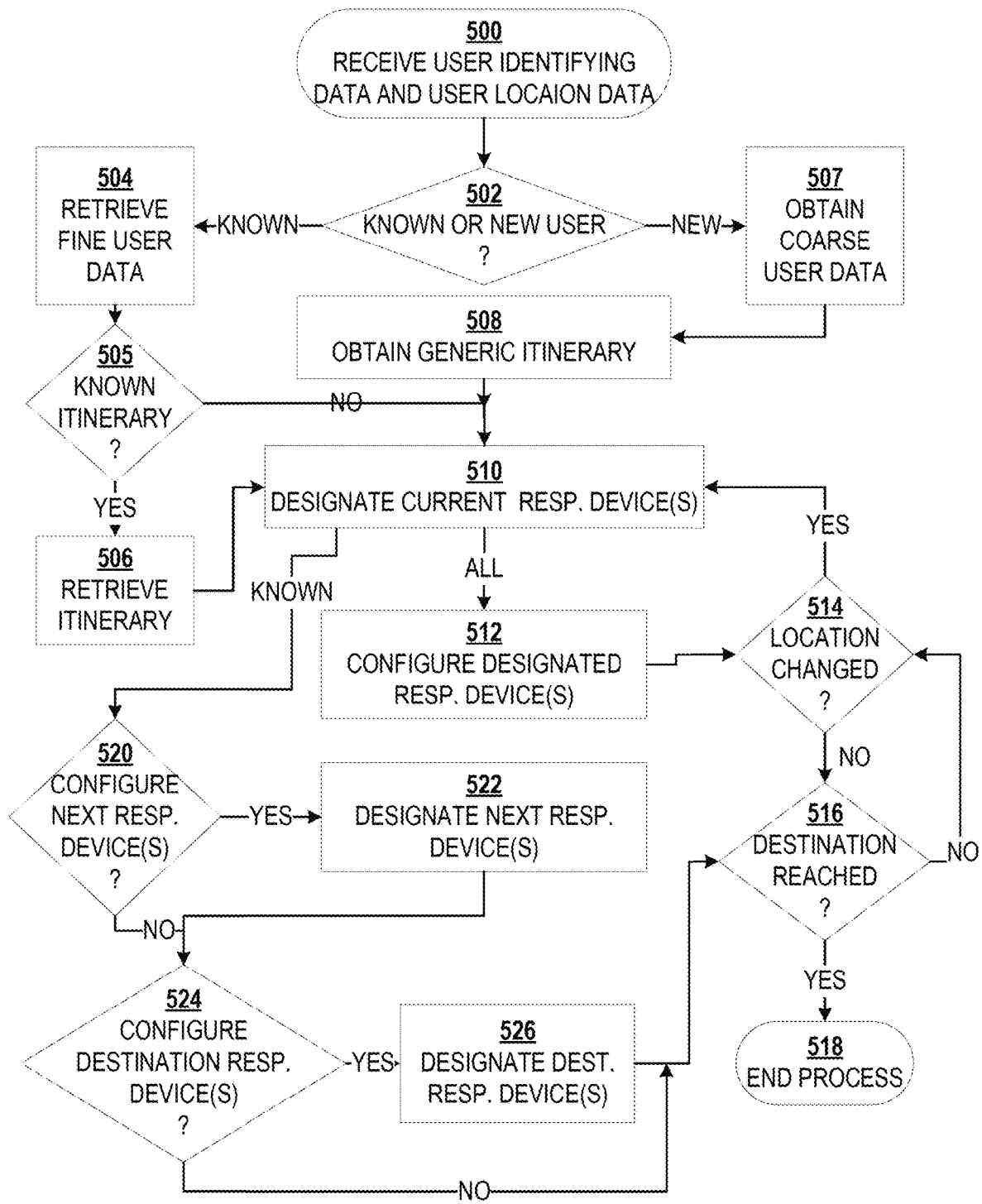
FIG. 5 is a flow chart illustrating a process for responding to a detected user in accordance with at least one implementation of the present disclosure.

For at least one implementation, the hub response engine 306 may configure the system 200 to perform one or more operations shown, for example, in FIG. 5. The hub response engine 306 may configure the system 200 to perform less, more and/or other operations than those shown in FIG. 5.

For at least one implementation, the hub response engine 306 may configure the system 200 to perform one or more actions based on user data 314. The hub response engine 306 may configure the system 200 to perform one or more actions at a first user location 118(1) while configuring the system to perform one or more second actins at a second user location 118(2), at a different time, or the like.

More specifically referring to FIG. 5 which illustrates a process for at least one implementation, the hub response engine 306 may configure the system 200 to perform an initialization operation, Operation 500, upon detection and tracking of a user, and as per one or more of the operations of the hub tracker engine 304. For at least one implementation, the hub response engine 306 may be configured to initiate actions upon receiving user identifying data and user location data from a hub tracker engine 304. The user identifying data may be for a known user, as may occur when Operation 414 results in a match, or for a new user, as may be provided a new user data set generated per Operation 415.

As shown per Operation 502, the process include determining whether the received user data is for a known user or a new user. If "known", the process may proceed with Operations 504-506. If "new," limited data, if any, may be available for the user and the process may proceed with Operation 507.

As shown per Operation 504, when a known user has been detected and communicated by the hub tracker engine to the hub response engine, the process may include retrieving fine user data for the known user from the hub data store 308. The process may continue with Operation 505.

As shown per Operation 505, the process may include determining, for a known user, whether a known itinerary exists. If "yes," the process may include Operation 506. If "no," the process may proceed with Operation 508.

As shown per Operation 506, the process may include retrieving an itinerary for the known user. The itinerary may identify where a user is scheduled to be next located within the structure 100 and/or one or more next activities the user is scheduled to attend and/or perform, whether instead or outside the structure (such as a dinner reservation or a sporting event outside the structure). For at least one implementation, a user itinerary may be obtained from any data source including the hub data store 308, a user device data store, a Cloud data store, or otherwise, including external data sources, such as riding sharing, airline or train platforms, ticketing platforms, or restaurant reservation platforms. The process may proceed with Operation 510.

As shown per Operation 507, when a "new" (or otherwise unknown) user has been detected, the process may include obtaining coarse user data for the hub data store 308. For at least one implementation, coarse user data may include user data for a group of users, such as those attending a conference. For example, a conference of attendees from a cold latitude may generally prefer a lower room temperature setting than a conference of attendees from a warmer latitude may generally prefer.

As shown per Operation 508, the process may include obtaining a generic itinerary. A generic itinerary may be associated with coarse user data. For example, a given user may be generically identified as participating or likely participating in a given conference event, from e.g., a known schedule of events, and a corresponding generic itinerary may be associated with the given user. For example, a keynote speaker presenting at a given time and at a given environ 106 within the structure 100 may be used to generate a generic itinerary for conference attendees.

As shown per Operation 510, the process may include designating one or more current user location responding devices ("current responding device(s)") to perform a current action. The designation may include configuring the current responding device in view of one or more of coarse user data, fine user data, known itinerary data, generic itinerary data, other data, combinations of two or more of the forgoing, or otherwise. The process may include two tracks, one for known users and one for new users. For known user and new users (as shown, "all"), the process may include Operations 512-518. For known users, the process may additionally include Operations 520-526.

As shown, per Operation 512, the process may include configuring one or more designated responding devices. The configuring of designated responding devices may include any actions for a given responding device. Non-limiting examples of such actions may include turning on/off a light, opening/closing blinds, or otherwise.

As shown per Operation 514, the process may include determining whether a location of the user has changed. In performing Operation 514, the hub response engine 306 may periodically, randomly, on a scheduled basis, or otherwise query the hub tracker engine 304 for current user tracking data, as generated, e.g., per Operation 416. When the location has changed, the process may resume at Operation 510.

As shown per Operation 516, the process may include determining whether a known destination (if any), a generic destination, or a de facto destination has been reached by the user. In performing Operation 515, the hub response engine 306 may periodically, randomly, on a scheduled basis, or otherwise query the hub tracker engine 304 for current user tracking data, as generated, e.g., per Operation 416. A de facto destination may be reached, for at least one implementation, when a given user's location has not changed within a given period, by a given time, or otherwise. Such period, time, and otherwise may be pre-determined, then determined, user determined, generically determined, randomly determined, or otherwise. The process may proceed to Operation 518 when the destination has been reached, otherwise the process may continue with Operation 514.

As shown per Operation 518, the process may end. When the process has ended, future user detection, actions, or the like, as determined by the hub tracker engine 304 may result in a resumption of one or more of the operations shown in FIG. 5 being performed by the system and in furtherance of instructions provided by the hub response engine 306 to one or more system 200 elements.

As shown per Operation 520, the process may include determining whether a next responding device is to be designated for one or more next actions. A next responding device may include a responding device with respect to which the hub processor 302 has not sent a response instruction within a given period. Such given period may be contextually based, time based or otherwise. For example, a first response instruction to a hotel room may include activating an air conditioning system, while a next responding instruction (not having been previously sent) for the given room and in view of the given user, may include activating a television and selecting a given channel, e.g., a news or sports channel.

As shown per Operation 522, the process may include designating the one or more next responding devices to perform the next action(s), which may result in the hub response engine 306 preparing a queue of two or more instructions to be provided in one or more responding devices at one or more environs 106 and/or within one or more environ portions of a given structure 100.

As shown per Operation 524, the process may include determining whether a destination responding device is to be designated for one or more destination actions.

As shown per Operation 526, the process may include designating the one or more destination responding devices, which may result in the hub response engine 306 preparing a queue of two or more instructions to be provided in one or more responding devices at one or more environs 106 and/or within one or more environ portions of a given structure 100 identified as a destination location for the user.

Accordingly, it is to be appreciated that with respect to at least the implementation of FIG. 5, implementations of the present disclosure may include designating one or more current, next and/or destination responding devices to perform one or more actions in view of coarse and/or fine data for a given user, in view of known and/or generic itinerary data for the given user and/or for a group of users with which a given user can be associated, and/or in view of current user location, changes of location and/or other tracker data as generated by one or more tracker nodes and as further processed by a hub tracker engine 304.

The various operations shown in FIG. 5 are described herein with respect to at least one implementation of the present disclosure. The described operations may arise in the sequence described, or otherwise and the various implementations of the present disclosure are not intended to be limited to any given set or sequence of operations. Variations in the operations used and sequencing thereof may arise and are intended to be within the scope of the present disclosure.

Hub Data Store 308

Any known or later arising storage technologies may be utilized for the hub data store 308. Non-limiting examples of devices that may be configured for use as the hub data store 308 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others. In at least one implementation, the hub data store 308 may be configured using flash memory technologies, micro-SD card technology, as a solid-state drive, as a hard drive, as an array of storage devices, or otherwise. The hub data store 308 may be configured to have any data storage size, read/write speed, redundancy, or otherwise.

The hub data store 308 may be provided locally with the hub 108 or remotely, such as by a data storage service provided on the Cloud, and/or otherwise. Storage of data may be managed by a storage controller (not shown) or similar component. It is to be appreciated such storage controller manages the storing of data and may be instantiated in one or more of the hub data store 308, the hub processor 302, on the Cloud, or otherwise. Any known or later arising storage technologies may be utilized in conjunction with an implementation of the present disclosure to facilitate the hub data store 308.

The hub data store 308 may be configured to provide temporary/transient and/or permanent/non-transient storage of one or more data sets, computer instructions, and/or other information. Data sets may include, for example, location data 310, user location data 312, user data 314, and tracker node and responding device data 316.

The hub data store 308 may be further configured to operate in combination and/or conjunction with one or more servers (not shown). The one or more servers may be coupled to the hub 108, a remote storage device (not shown), other devices that are internal and/or external device to the hub 108, to one or more tracker nodes 110, responding devices 112, or otherwise. The server(s) may be configured to execute computer instructions which facilitate at least one implementation of the present disclosure. For at least one implementation, one or more of the storage components may be configured to store one more data sets, computer instructions, and/or other information in encrypted form using known or later arising data encryption technologies.

Location Data 310

Location data 310 may include data regarding one more properties and/or characteristics of a given structure 100 and/or one or more environs 106. For example, location data 310 may identify where locations in a given structure are covered by one or more, if any, tracker nodes 110. Location data 310 may include general settings for a given structure 100 or environ 106, limitations on settings for a given environ 106 (e.g., a bathroom water temperature for a guest room that include children having a lower maximum and a higher minimum water temperature settings), and the like.

User Location Data 312

User location data 312 may include data for a past, present or future location of a given user or group thereof. For example, user location data 312 may identify which user is assigned to a given guest room, which users are permitted in certain environs and prohibited in other environs, where the user is and/or has been, and otherwise.

For at least one implementation, user location data 312 may be populated based on tracker data received from one or more tracker nodes 110, location data received from a UDT 116, combinations of the foregoing, or otherwise.

User Data 314

User data 314 may include data about a user or group thereof. Non-limiting examples of user data 314 include demographic, psychographic, attitudinal, behavioral, engagement, historical, and other forms of user data. User data 314 may include identifications of user preferences, needs, wants, likes, dislikes, or otherwise. User data may range from a general specificity (e.g., the user likes beer) to a high specificity (e.g., the user like GUINNESS™ beer). User data may include data that can be used to visibly identify a user, by a person, artificial intelligence, or otherwise, such as one or more facial properties, gait properties, body build properties, and the like. User data 314 may include information regarding one or more, if any, user tracker devices (UTDs) 116, and/or user devices 120 associated with the user, such as make, model, configurations, applications present, user settings, or the like.

Tracker Node & Responding Device Data 314

Tracker Node & Responding device data 314 may include data regarding one or more capabilities, configurations, characteristics, locations, or otherwise regarding one or more tracker nodes and/or responding devices. Non-limiting examples of such data include make, model, location, capabilities, limitations, communications protocols utilized, device identifiers, configuration settings, and the like.

Interfaces

The hub 108 may include one or more interfaces which facilitate interactions by and between the hub 108 and other system components and/or an operator of the hub 108. For example, an operator interface 318 may be provided to facilitate interactions between the hub 108 and an operator thereof, such operator commonly being a human being, an artificial intelligence, or the like. The hub 108 may include a tracker node interface 320 which facilitates interactions with one or more tracker nodes 110. The hub 108 may include a responding device interface 322 with facilitates interactions with one or more responding devices 112. The hub 108 may include a user tracker interface 324 which facilitates interactions with one or more user tracker devices 116. The hub 108 may include a user device interface 326 which facilitates interactions with one or more user devices 120.

For at least one implementation of the present disclosure, the interfaces include hardware and software components which facilitate communications between two or more elements of the system 100. For example, and not by limitation, the interfaces include currently known and/or later arising antennas, ports, connectors, transceivers, data processors, signal processors and the like which facilitate connection of the hub 108 to at least one tracker node 110, at least one responding device 112 and, when present and coupled to the system 100, a user tracker device 116 and/or a user device 120. Such elements are well known in the art and are individually and collectively referred to herein as "interfaces."

Non-limiting examples of technologies that may be utilized with the interfaces and in accordance with one or more implementations of the present disclosure including Bluetooth, ZigBee, Near Field Communications, Narrowband IOT, WIFI, 3G, 4G, 5G, cellular, and other currently arising and/or future arising wireless communications technologies. The interfaces may be configured to include one or more data ports (not shown) for establishing connections between a hub 108 and another device, such as a laptop computer. Such data ports may support any known or later arising technologies, such as USB 2.0, USB 3.0, ETHERNET, FIREWIRE, HDMI, and others. The interfaces may be configured to support the transfer of data formatted using any protocol and at any data rates/speeds. The interfaces may be connected to one or more antennas (not shown) to facilitate wireless data transfers. Such antenna may support short-range technologies, such as 802.11a/c/g/n and others, and/or long-range technologies, such as 4G, 5G, and others. The interfaces may be configured to communicate signals using terrestrial systems, space-based systems, and combinations thereof systems. For example, a hub 108 may be configured to receive GPS signals from a satellite directly, by use of an intermediary device (not shown), or otherwise.

Operator Interface 318

The operator interface 318 includes commonly known and/or later arising components which facilitate hub 108 to operator interchange of data and information, as used herein, "information" refers to data that is provided/output in a humanly perceptible form to a person. Non-limiting examples of operator interface 318 components include those facilitating the providing of data, in an information form, to an operator in one or more of an audible, visual, tactile, or other format.

For example, an operator interface 318 may include an audio input/output (I/O) interface, support a receiving and/or presenting of audible content to a person via a hub 108 and/or another device, such as smartphone associated with a given person, or otherwise. Such audible content (which is also referred to herein as being "audible signals") may include spoken text, sounds, or any other audible information. Such audible signals may include one or more of humanly perceptible audio signals, where humanly perceptible audio signals typically arise between 20 Hz and 20 KHz. The range of humanly perceptible audio signals may be configurable to support an audible range of a given individual person.

An audio I/O interface includes hardware and computer instructions (herein, "audio technologies") which supports the input by and output to, of audible signals to a person. Such audio technologies may include noise cancelling, noise reduction, technologies for converting human speech to text, text to speech, translation from a first language to one or more second languages, playback rate adjustment, playback frequency adjustment, volume adjustments and otherwise.

An audio I/O interface may use one or more microphones and speakers to capture and present audible signals respectively from and to a person. Such one or more microphones and speakers may be provided by a given hub 108 itself or by a device communicatively coupled to an audible device component. For example, earbuds may be communicatively coupled to a smartphone, with the earbuds functioning as an audio I/O interface and capturing and presenting audio signals as sound waves to and from a given person. For at least one implementation, the smartphone may function as a hub 108.

An audio I/O interface may be configured to automatically recognize and capture comments spoken by a person and intended as audible signals for sharing with others, with the hub or otherwise. For example, a user may issue a command or query to the hub 108. In response to such a query, the hub 108 may respond using an audible, visual or other signal.

An operator interface 318 may include a visual I/O interface configured to support the receiving and presenting of visual content (which is also referred to herein as being "visible signals") with a person. Such visible signals may be in any form, such as still images, motion images, augmented reality images, virtual reality images, and otherwise.

A visual I/O interface includes hardware and computer instructions (herein, "visible technologies") which supports the input by and output of visible signals to a person. Such visible technologies may include technologies for converting images (in any spectrum range) into humanly perceptible images, converting content of visible images into a given person's perceptible content, such as by character recognition, translation, playback rate adjustment, playback frequency adjustment, and otherwise.

A visual I/O interface may be configured to use one or more display devices, such as the internal display (not shown) and/or external display (not shown), that are configured to present visible signals to the person. It is to be appreciated that any existing or future arising visual I/O interfaces, devices, systems and/or components may be utilized by and/or in conjunction with a hub 108 to facilitate the capture, communication and/or presentation of visual content (e.g., in one or more humanly visibly perceptible signals) to a person.

The various operations shown in FIGS. 4 and 5 are described herein with respect to at least one implementation of the present disclosure. The described operations may arise in the sequence described, or otherwise and the various implementations of the present disclosure are not intended to be limited to any given set or sequence of operations. Variations in the operations used and sequencing thereof may arise and are intended to be within the scope of the present disclosure.

Although various implementations have been described with a certain degree of particularity, or with reference to one or more individual implementations, those skilled in the art could make alterations to the disclosed implementations without departing from the spirit or scope of the claims. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various implementations of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any combinations of elements and operations of an implementation of the present disclosure. Other implementations are therefore contemplated. It is intended that the matter contained in the above description and shown in the accompanying drawings shall be interpreted as illustrative implementations and not limiting. Changes in detail or structure may be made without departing from the basic elements recited in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device permanently, may be updateable, and are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

What is claimed is:

1. A system comprising:
   a hub comprising:
     a data store, non-transiently storing tracker computer instructions for a hub tracker engine and non-transiently storing response computer instructions for a hub response engine; and
     a processor, coupled to the data store;
   a tracker node coupled to the hub; and
   a responding device coupled to the hub;
   wherein when the tracker computer instructions are executed by the processor and the hub tracker engine is instantiated, the hub tracker engine instructs the system to perform tracking operations including:
     a coarse user detection operation; and
     when a user has been detected by the coarse user detection operation, the tracking operations further include:
       tracking the user within a structure;
       determining whether to respond to the user; and
       when the determining results in a decision to respond to the user, initiating the hub response engine; and
   wherein when the response computer instructions are executed by the processor and the hub response engine is instantiated, the hub response engine instructs the system to perform response operations including:
     configuring the responding device as at least one of a current responding device, a next responding device, and a destination responding device.

2. The system of claim 1,
   wherein the coarse user detection operation further comprises:
     powering-on the tracker node;
     establishing a tracker link between the tracker node and the hub;
     receiving, by the hub, a tracker data signal from the tracker node; and
     analyzing the tracker data signal for a presence of the user therein.

3. The system of claim 2,
   wherein, when the user has been detected by the coarse user detection operation,
     the tracking operations further comprise:
       identifying a basis for detection of the user.

4. The system of claim 3, further comprising:
   wherein the basis for detection of the user includes image detection.

5. The system of claim 4,
   wherein for image detection, the tracking operations further comprise:
     identifying an image property;
     searching the data store for user image data corresponding to the image property; and
     determining if a match occurs between the image property and the user image data.

6. The system of claim 5,
   wherein the basis for detection of the user further includes an audible signal; and
   wherein for the tracking operations further comprise:
     identifying an audible property for the audible signal;
     searching the data store for audible user data corresponding to the audible property; and
     determining if a match occurs between the audible property and the audible user data.

7. The system of claim 4, further comprising:
   a user tracker device (UTD), coupled to the hub, and logically and physically associated with the user;
   wherein the UTD communicates to the hub a location data signal which identifies a current location of the user.

8. The system of claim 7,
   wherein the location data signal periodically is communicated by the UTD to the hub.

9. The system of claim 1,
   wherein a current responding device, with respect to the user, is associated with a current action to be performed at a current location of the user;
   wherein a next responding device, with respect to the user, is associated with a next action to be performed at the current location or at a second location of the user;
     wherein the second location occurs, in time, after the current location;
   wherein a destination responding device, with respect to the user, is associated with a destination action to be performed at a destination location of the user; and
   wherein the destination location occurs after the current location and the second location.

10. The system of claim 1
    wherein the response operations further comprise:
    determining whether the user is a known user or a new user;
    when the user is a new user, the response operations further comprising:
      obtaining coarse user data; and
      obtaining a generic itinerary;
    when the user is a known user, the response operations further comprising:
      obtaining fine user data;
      determining if a known itinerary is available;
      obtaining the known itinerary when the known itinerary is available; and
      obtaining the generic itinerary when the known itinerary is not available; and
    designating the responding device as a current responding device when a location of the responding device corresponds with a current location of the user.

11. The system of claim 10,
    wherein, when the user is a known user, the response operations further comprise:
      determining whether a next responding device is to perform a next action;
        wherein the next action is to be performed at the current location of the user or at a second location of the user;
        wherein the second location occurs, in time, after the current location; and
        when the determining results in a "yes," designating the next responding device to perform the next action.

12. The system of claim 11,
    wherein, when the user is a known user, the response operations further comprise:
      determining whether a destination responding device is to perform a destination action.

13. The system of claim 12, further comprising:
    a user tracker device (UTD), coupled to the hub, and logically and physically associated with the user;
    wherein the UTD communicates to the hub a location data signal which identifies a current location of the user.

14. The system of claim 1,
    wherein the responding device further comprises a smart device.

15. The system of claim 14,
    wherein the smart device is at least one of a smart thermostat, a smart light, and a smart lock.

16. A system comprising:
a hub comprising:
   a data store, coupled to the processor, non-transiently storing tracker computer instructions for a hub tracker engine; and
   a processor;
a tracker node, coupled to the data store;
a responding device coupled to the hub;
wherein when the tracker computer instructions are executed by the processor and the hub tracker engine is instantiated, the hub tracker engine instructs the system to perform tracker operations including:
   a fine user detection operation; and
   when a user has been detected by the fine user detection operation, tracking the user.

17. The system of claim 16,
wherein the tracker operations further comprise:
identifying a basis for the fine user detection of the user; and
when the basis is an image:
   identifying an image property;
   searching the data store for user image data corresponding to the image property; and
   determining if a match occurs between the image property and the user image data;
when the basis is an audible signal:
   identifying an audible property for the audible signal;
   searching the data store for audible user data corresponding to the audible property; and
   determining if a match occurs between the audible property and the audible user data; and
when the basis is a location data signal received from a user tracker device (UTD):
   identifying UTD data;
   searching the data store for UTD data corresponding to the location data signal; and
   determining if a match occurs between the location data signal and the UTD data.

18. The system of claim 16,
wherein the data store non-transiently stores response computer instructions for a response engine;
wherein when the response computer instructions are executed by the processor and the response engine is instantiated, the hub instructs the responding device to perform response operations comprising:
   configuring the responding device as at least one of a current responding device, a next responding device, and a destination responding device.

19. The system of claim 18,
wherein the current responding device is associated with a current user action to be performed at a current user location;
wherein the next responding device is associated with a next user action to be performed at the current user location or at a second user location;
wherein the second user location occurs, in place, after the current user location;
wherein the destination responding device is associated with a destination user action to be performed at a destination user location; and
wherein the destination user location occurs, in place, after the current user location and the second user location.

20. A computer readable medium non-transiently storing computer instructions which, when executed by a processor, instruct a system to detect, track and act responsively to a user by performing tracking operations and response operations, wherein the tracking operations comprise:
   a fine user detection of the user or a coarse user detection of the user; and
   tracking the user; and
wherein the response operations, for the fine user detection of the user, comprise:
   retrieving fine user data from a data store;
   determining if a user itinerary is known; and
   if the user itinerary is known, retrieving the user itinerary from the data store; and
wherein the response operations for both the fine user detection and the coarse user detection comprise:
   configuring a first responding device as at least one of a current responding device, a next responding device, and a destination responding device;
   wherein a current responding device, with respect to the user, is associated with a current action to be performed at a current location of the user;
   wherein a next responding device, with respect to the user, is associated with a next action to be performed at the current location or at a second location of the user;
   wherein the second location occurs, in at least one of place and time, after the current location;
   wherein a destination responding device, with respect to the user, is associated with a destination action to be performed at a destination location of the user; and
   wherein the destination location occurs, in at least one of place and time, after the current location and the second location.

\* \* \* \* \*